US007076798B2

(12) United States Patent
Chang et al.

(10) Patent No.: US 7,076,798 B2
(45) Date of Patent: Jul. 11, 2006

(54) SECURING NON-EJB CORBA OBJECTS USING AN EJB SECURITY MECHANISM

(75) Inventors: David Yu Chang, Austin, TX (US); Robert Howard High, Jr., Round Rock, TX (US); Nataraj Nagaratnam, Morrisville, NC (US); Russell Ley Newcombe, Round Rock, TX (US); Lori Jane Milhans VanGulick, Cedar Park, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 885 days.

(21) Appl. No.: 10/068,335

(22) Filed: Feb. 7, 2002

(65) Prior Publication Data

US 2003/0149893 A1 Aug. 7, 2003

(51) Int. Cl.
*H04L 9/32* (2006.01)
(52) U.S. Cl. .............................. 726/4; 726/28; 713/167; 709/219; 709/229; 719/330
(58) Field of Classification Search ...................... None
See application file for complete search history.

(56) References Cited

U.S. PATENT DOCUMENTS

| | | | |
|---|---|---|---|
| 5,727,145 A | | 3/1998 | Nessett et al. |
| 5,732,270 A * | | 3/1998 | Foody et al. ............... 719/316 |
| 5,764,887 A * | | 6/1998 | Kells et al. .................. 713/200 |
| 6,182,154 B1 * | | 1/2001 | Campagnoni et al. ....... 719/315 |
| 6,219,787 B1 | | 4/2001 | Brewer |
| 6,226,746 B1 | | 5/2001 | Scheifler |
| 6,269,373 B1 * | | 7/2001 | Apte et al. .................... 707/10 |
| 6,298,478 B1 | | 10/2001 | Nally et al. |
| 6,609,158 B1 * | | 8/2003 | Nevarez et al. ............. 719/316 |
| 6,915,520 B1 * | | 7/2005 | Sanchez, II ................. 719/315 |
| 6,951,021 B1 * | | 9/2005 | Bodwell et al. ............ 719/316 |

OTHER PUBLICATIONS

Orfali et al, Instant CORBA, 1997, John Wiley & Sons, pp. 151-160.*
Krishnan S., Enterprise JavaBeans to CORBA Mapping, Sun Microsystems, 1999, Retrieved from the Internet on Feb. 24, 2006: <URL: http://lumumba.uhasselt.be/takis/docs/ejb1_1-corba.pdf>.*

* cited by examiner

*Primary Examiner*—Kambiz Zand
*Assistant Examiner*—Minh Dinh
(74) *Attorney, Agent, or Firm*—David A. Mims, Jr.; Dillon & Yudell LLP

(57) ABSTRACT

A method and system for providing security protection to Common Object Request Broker Architecture (CORBA) objects located on a server. An EJB shadow object is created for the CORBA object. The EJB shadow object invokes an EJB security mechanism on behalf of the CORBA object, thus protecting the CORBA object from unauthorized object requesters. In a preferred embodiment, requesters are categorized and identified by their roles in the enterprise. Only those requesters having a proper role are authorized to access the requested object.

12 Claims, 9 Drawing Sheets

SECURING NON-EJB CORBA OBJECTS USING AN EJB SECURITY MECHANISM

BACKGROUND OF THE INVENTION

1. Technical Field

The present invention relates in general to the field of computers, and, in particular, to the field of computer software. Still more particularly, the present invention relates to an improved method and system of using Enterprise JavaBean (EJB) security mechanisms to provide authorization security for non-EJB Common Object Request Broker Architecture (CORBA) objects in an object-oriented programming environment.

2. Description of the Related Art

Object-oriented programming (OOP) is a type of computer programming used in the development of operating system software as well as application software for a computer system. Contrary to traditional procedural programming techniques, OOP uses pre-engineered "methods" located within "objects" for the development of software. Methods are pre-configured software algorithms used to perform a particular task. Objects are self-contained software entities that consist of both methods plus variables (data) upon which the methods act. When created (instantiated) in a useful form, objects are typically referred to as "instances."

FIG. 1 graphically depicts the relationship between methods 12, variables 14 and instances 16, as well as a class 10 that defines instances 16. Class 10 is a software template from which individual instances 16 can be instantiated. Class 10 defines both the formats of variables 14 (e.g., integers, strings, pointers to other objects, etc.) as well as the methods 12 used by instances 16. While class 10 defines methods 12 and the format of variables 14 only once, each instance 16 (depicted as instances 16a–16c) may be unique depending on what data values populate variables 14. These data values represent each instance 16's particular content and location.

OOP allows the user programmer to call up objects (instances), and is implemented in two ways: client-side operations and server-side operations. Most of the earlier OOP operations were client-side, including those performed using Java™-a platform independent object-oriented programming language developed by Sun Microsystems, Inc. (Sun). Examples of client-side operations include servlets 20 and applets 22 as illustrated in FIG. 2. Applets 14 are portable Java programs that can be downloaded on the fly and can execute in an untrusted environment. Typically, applets 22 are deployed in a Web page sent from a web server 18 to a client computer 24, whose browser 26 contains a browser applet viewer to run applets 22. Applets 22 typically display a user interface on client computer 24. Servlets 20 are applets that run on web server 18 in Web server's servlet engine. Servlets 20 are networked components that can be used to extend the functionality of web server 18. Servlets 20 are request/response oriented, in that they take requests from browser 26 and issue a response back to client computer 24. Servlets 20 are often used for performing Web tasks such as rendering a HyperText Markup Language (HTML) interface to an e-commerce catalog.

Server-side operations are those that operate typically in an application server 28, as depicted in FIG. 3. Applications are sent from application server 28 to client computer 24 typically upon a request from client computer 24. Server-side operations are useful in executing complex algorithms or performing high-volume business transactions. Application server 28 provides a highly available, fault-tolerant, transactional and multiuser secure environment. While applets 22 and servlets 20 may be deployed in server-side operations, Enterprise JaveBean (EJB) objects 30 are primarily used for server-side operations.

Java 2 Platform, Enterprise Edition™ (J2EE), also developed by Sun, is a robust suite of middleware services for developing server-side applications. An integral part of J2EE is Enterprise JavaBeans™ (EJB), which is a specification that defines a server-side architecture that enables and simplifies the process of building enterprise-class s (appropriate for a large enterprise, i.e., business organization) EJB objects 30. EJB allows the writing of scalable, reliable and secure applications in a platform-independent environment similar to that found when using Java. Thus EJB components can be provided from a variety of vendors, and simply "plugged in" to a network system, regardless of that network system's operating system.

Many of the features of EJB are derived from the Common Object Request Broker Architecture (CORBA) specification. CORBA was invented by the Object Management Group (OMG), a consortium of eleven founding companies in 1989. While EJB and J2EE are designed for use with Java oriented OOP's, CORBA supports cross-language interaction. That is, CORBA allows an object written in one language (such as Java) to interact with a second object written in a second language (such as C++). While EJB is actually a modification of CORBA, and EJB objects are often referred to as EJB CORBA objects, EJB objects must comply with Java language protocols. While CORBA offers a broader software range due to its ability to cross-talk between languages, it requires complex middleware application program interfaces (API's) to communicate between objects.

Many servers, usually because of CORBA legacy programs, contain and serve both CORBA and EJB objects. While such servers, by EJB specification, have security mechanisms to control access to EJB objects, they may or may not have security protection for CORBA objects. To provide such security in the prior art, servers have had to create a separate server-side security mechanism for CORBA objects independent of EJB object security. This is a costly process and a duplication of security effort.

SUMMARY OF THE INVENTION

The present invention recognizes the inefficiency of having dual security mechanisms for Common Object Request Broker Architecture (CORBA) and Enterprise JavaBean (EJB) objects that are located on a server. To address this problem, an EJB shadow object is created for a CORBA object. The EJB shadow object invokes an EJB security mechanism on behalf of the CORBA object, thus protecting the CORBA object from unauthorized object requesters.

In an advantageous implementation of the present invention, a server receives a request for a method on a CORBA object. The request is directed to a shadow EJB object, which is complementary to the CORBA object. The shadow EJB object directs the request for the CORBA object method to an EJB-based security service. The EJB-based security service either permits the CORBA object method to be accessed, allowing the method to be run, or returns a message showing access as being denied to the requester.

In a preferred embodiment, requesters of the CORBA object are categorized and identified by their roles in an enterprise. Authorization for access to the CORBA object is obtained by referring to a method-role mapping table that defines which users are authorized to access the CORBA object. Only those requesters having a proper role are then permitted to access the requested object.

BRIEF DESCRIPTION OF THE DRAWINGS

The novel features of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
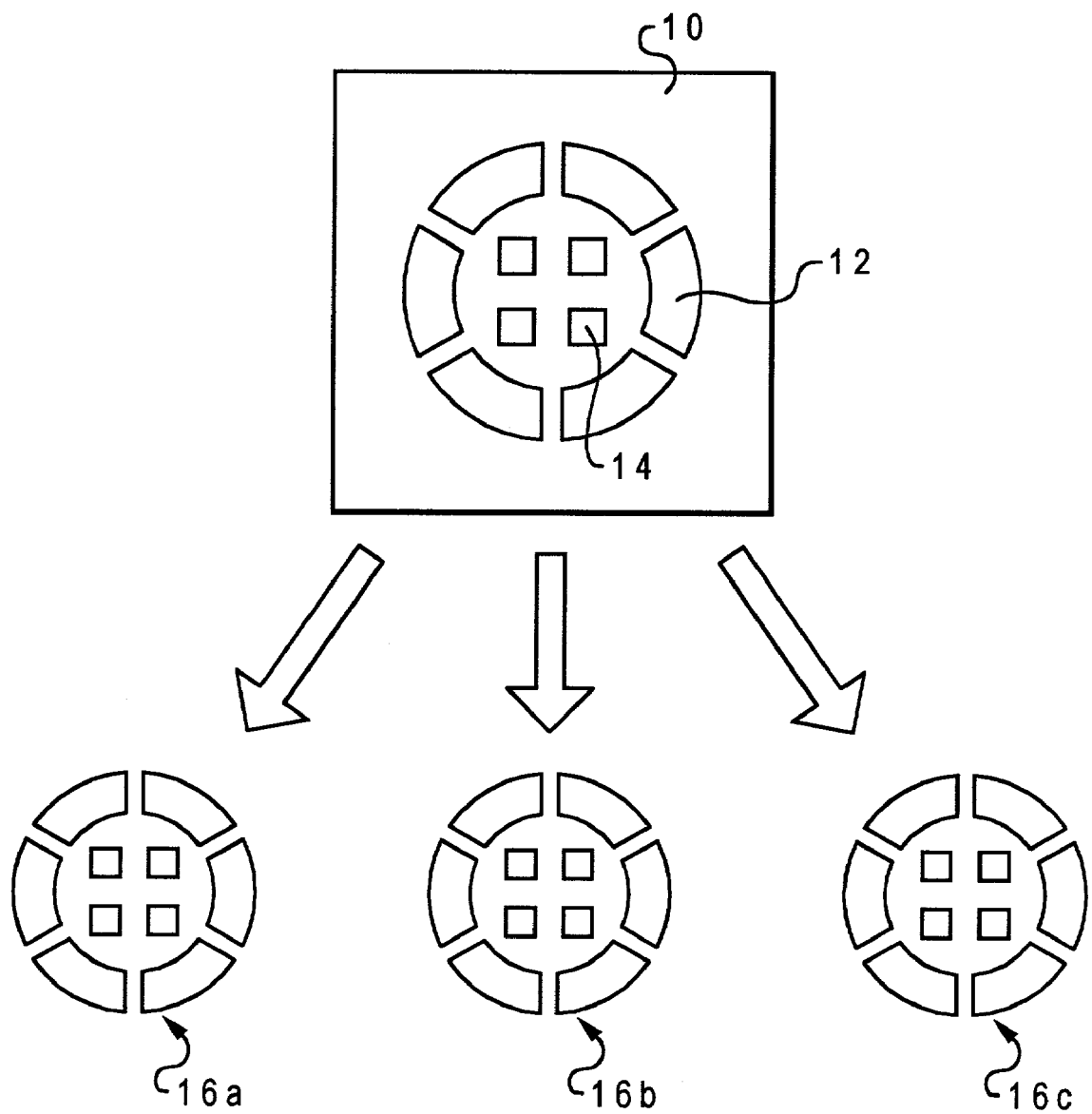
FIG. 1 graphically depicts relationships of Object Oriented Programming (OOP) methods, variables and instances.
Figure 2:
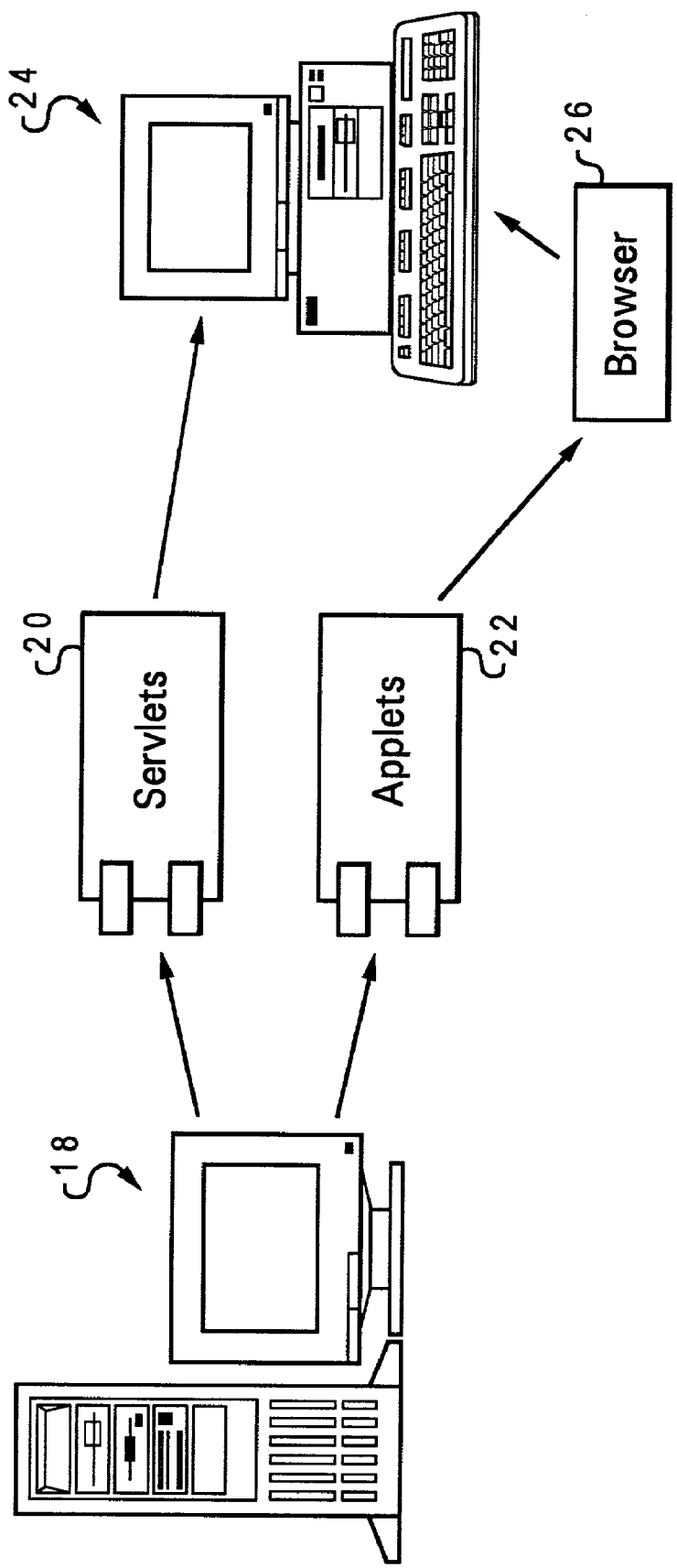
FIG. 2 illustrates a client-side implementation of OOP objects.
Figure 3:
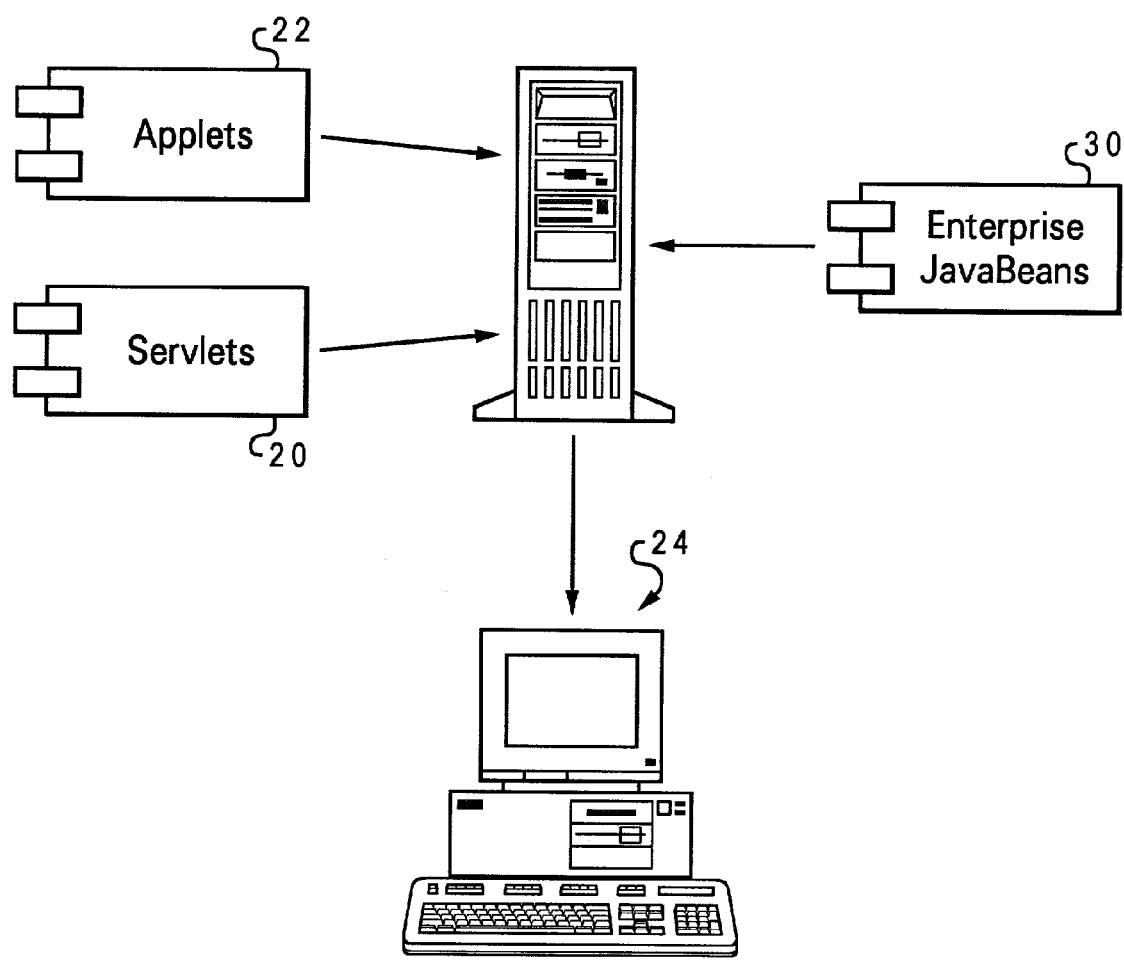
FIG. 3 depicts a server-side implementation of OOP objects.
Figure 4:
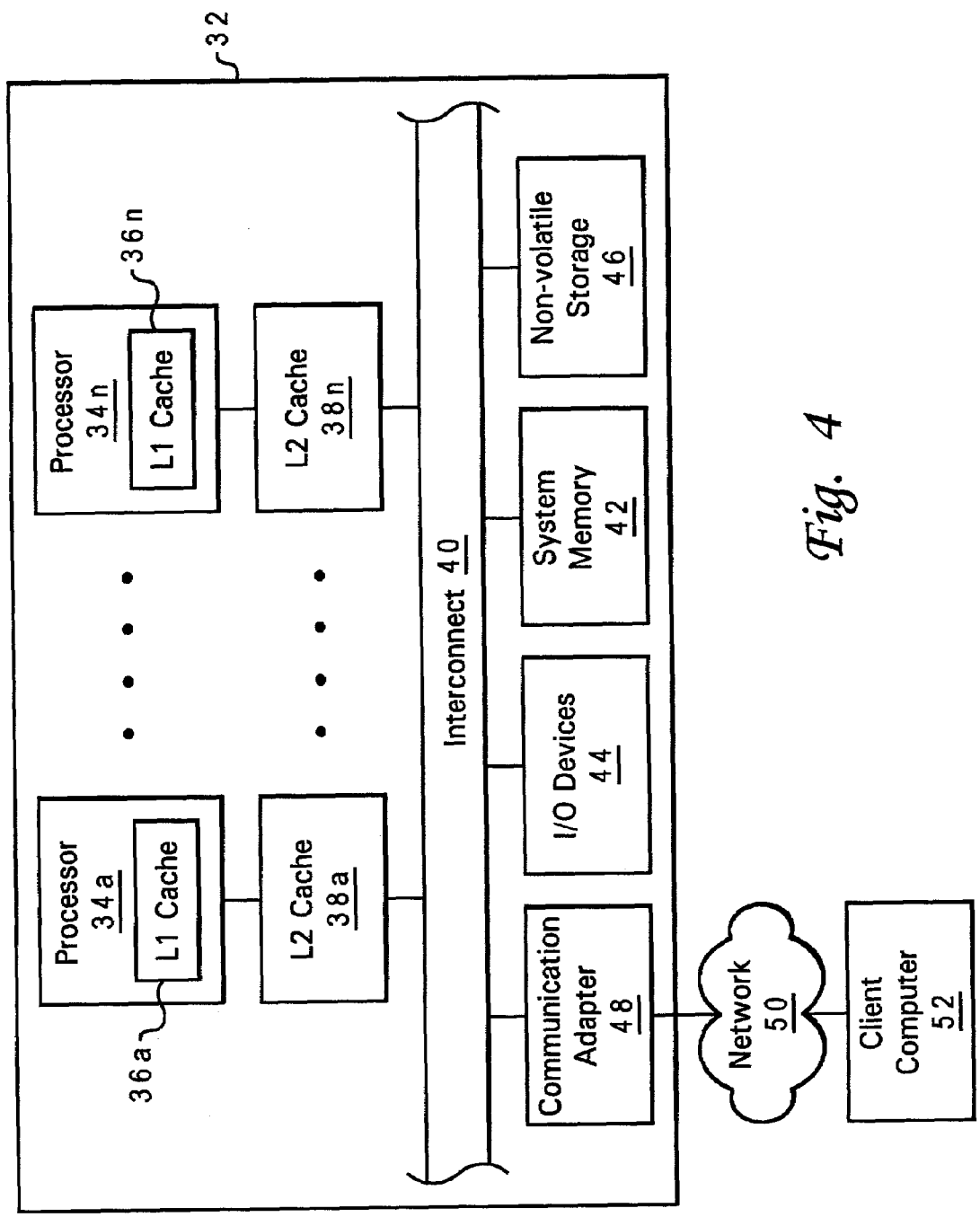
FIG. 4 illustrates a high-level block diagram of a network using a server, in accordance with the present invention.

With reference now to FIG. 4, there is illustrated a high-level diagram of a network using a server 32 in accordance with the present invention. As depicted, server 32 is a data processing system that preferably includes multiple processing units 34a–34n. In addition to the conventional registers, instruction flow logic and execution units utilized to execute program instructions, each of processing units 34a–34n also includes an associated one of on-board level one (L1) caches 36a–36n, which temporarily stores instructions and data that are likely to be accessed by the associated processor. Although L1 caches 36a–36n are illustrated in FIG. 4 as unified caches that store both instruction and data (both referred to hereinafter simply as data), those skilled in the art will appreciate that each of L1 caches 36a–36n could alternatively be implemented as bifurcated instruction and data caches.

In order to minimize access latency, server 32 also includes one or more additional levels of cache memory, such as level two (L2) caches 38a–38n, which are utilized to stage data to L1 caches 36a–36n. L2 caches 38a–38n function as intermediate storage between system memory 42 and L1 caches 36a–36n, and can typically store a much larger amount of data than L1 caches 36a–36n, but at a longer access latency. As noted above, although FIG. 4 depicts only two levels of cache, the memory hierarchy of server 32 could be expanded to include additional levels (L3, L4, etc.) of serially-connected or lookaside caches.

As illustrated, server 32 further includes I/O devices 44, a system memory 42, and a non-volatile storage 46, which are each coupled to interconnect 40. I/O devices 44 comprise conventional peripheral devices, such as a display device, keyboard, and graphical pointer, which are interfaced to interconnect 40 via conventional adapters. Non-volatile storage 46 stores an operating system and other software, which are loaded into volatile system memory 42 in response to server 32 being powered on.

Further connected to interconnect 40 is a communication adapter 48, which connects server 32 to a client computer 52 via a network 50. Network 50 may be a local area network (LAN) or a wide area network (WAN) such as an Internet. Client computer 52 may be a "thin" computing device having limited resident application software or a "fat" computer device having extensive resident application software.

Figure 5:
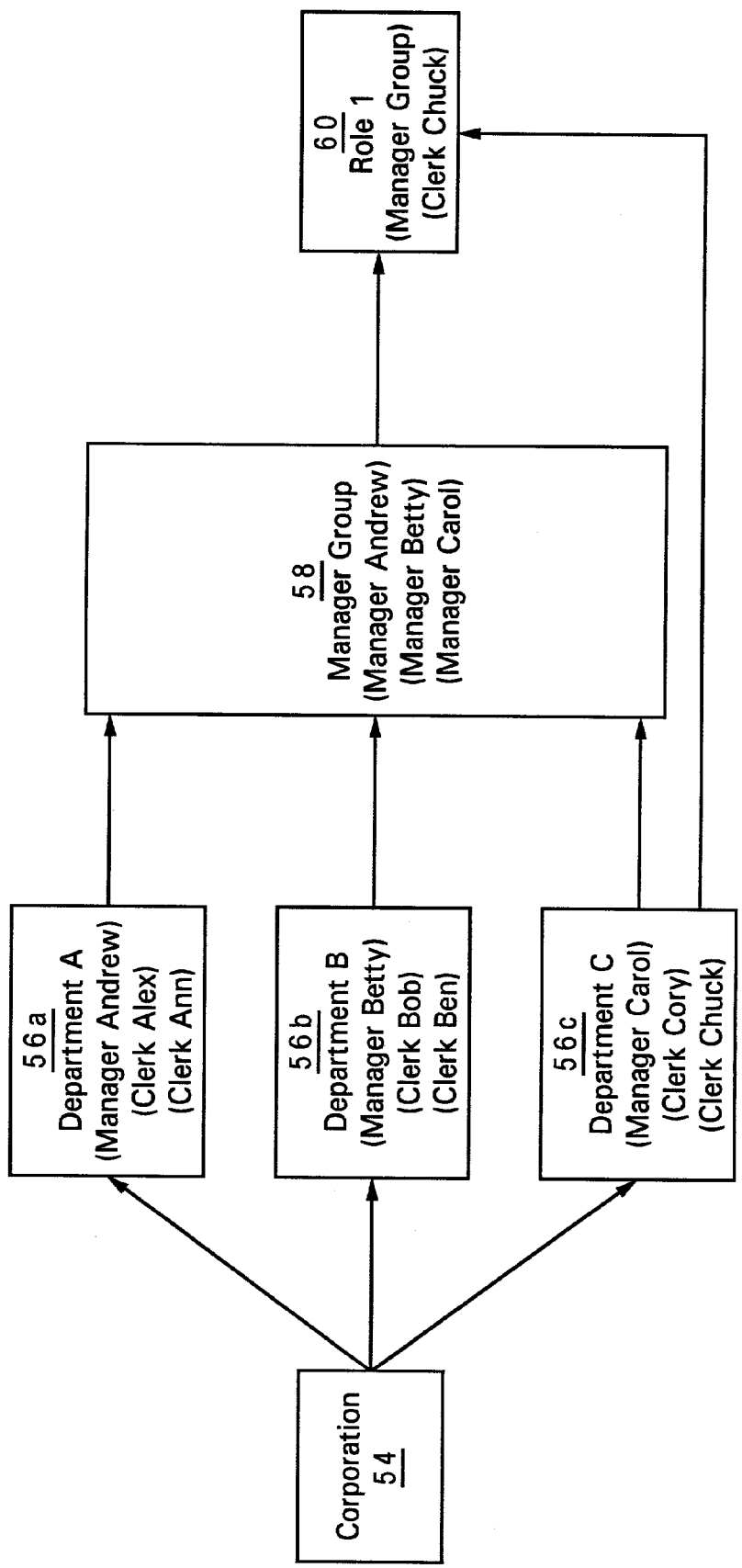
FIG. 5 depicts a Role Based Authorization scheme for user authorization to access an OOP method.

With reference now to FIG. 5, there is illustrated a Role Based Authorization (RBA) scheme for an enterprise depicted as corporation 54. It is understood that such an enterprise may alternately be any large business organization, school, governmental agency, etc. Corporation 54 is broken out into departments A, B, and C, as depicted in blocks 56a, 56b, and 56c respectively. Each person in corporation 54 is assigned a role by corporation 54's network system manager (not shown). For example, Role 1, illustrated in block 60, is assigned to all persons defined as managers and thus belonging to a Manager Group, depicted as block 58. Further, non-manager "Clerk Chuck" from Department C is depicted as having been authorized by the network system manager to be assigned Role 1 as well. The purpose of a role is to authorize a specific user access to a particular data, such as an Object Oriented Program (OOP) object described below. Details of how such authorization occurs follows.

Figure 6:
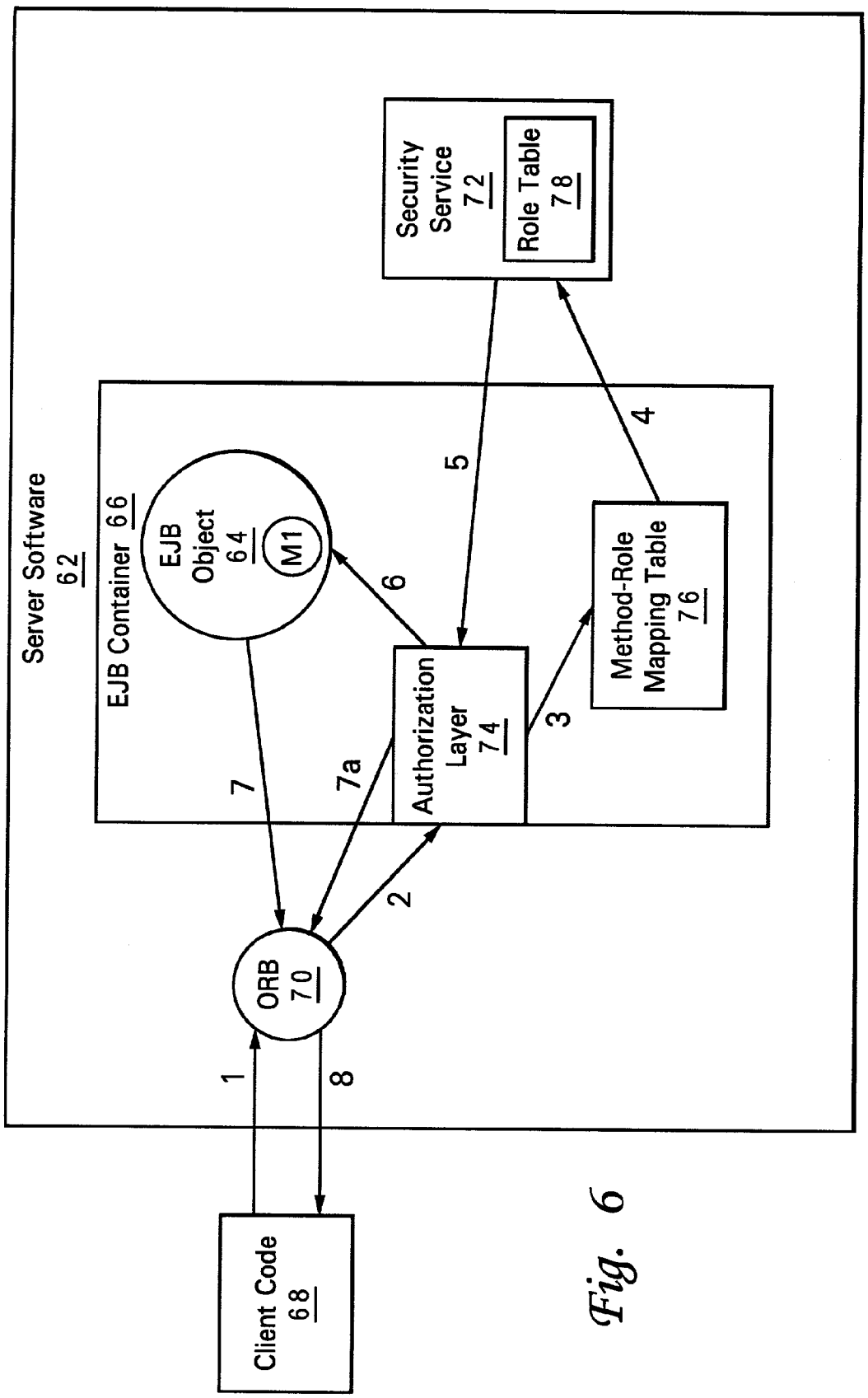
FIG. 6 is a software diagram illustrating the use of Enterprise JavaBeans (EJB) security measures to authorize access to an EJB method.

Referring now to FIG. 6, there is depicted a software diagram showing how client code 68 for a specific client user accesses an EJB method M1 located in an Enterprise JavaBean (EJB) object 64, an OOP object, through a security service 72, which is a security software system. In the scenario depicted in FIG. 6, within server software 62 are only Enterprise JavaBean (EJB) objects, of which only one is depicted and identified as EJB object 64. Preferably, EJB object 64 includes several methods, but only the single EJB method M1 is shown for clarity.

Server software 62, which is accessed and run by server 32 (depicted in FIG. 4) communicates with client code 68, which is associated with client computer 52 (also shown in FIG. 4) and used by the specific user. EJB object 64 is understood to have been previously created, preferably using an EJB home object (not shown), in a process understood by those skilled in the art of computer programming and familiar with the Java 2 Platform, Enterprise Edition™ (J2EE) and EJB specifications. EJB object 64 s operates within EJB container 66, which is a software environment that manages and executes EJB objects 64. While only one EJB object 64 is shown for clarity's sake, preferably each EJB container 66 contains multiple EJB objects 64. Likewise, while server software 62 is illustrated as having only one EJB container 66 for purposes of clarity, preferably server software 62 contains multiple EJB containers 66.

When client code 68 wishes to evoke EJB method M1 in EJB object 64, it sends a request to Object Request Broker (ORB) 70 (Arrow 1). ORB 70 is software, located within server software 62, whose function includes routing requests from client code 68 to a method in an OOP object, and routing method responses (results of an operation) from the OOP object back to client code 68. Thus in FIG. 6, ORB 70 directs the request from client code 68 for EJB method M1 to EJB container 66 (Arrow 2). The request must first pass through an authorization layer 74, which is a security layer of software, defined by the J2EE and EJB specifications, that screens requests for objects found within EJB container 66.

A method-role mapping table 76, which preferably has been previously created by the system manager, is a database accessible to authorization layer 74. Method-role mapping table 76 contains a listing of which roles are authorized to access particular methods, such as EJB method M1. Part of the request protocol from client code 68 identifies the particular user making the request for EJB method M1. Thus, authorization layer 74 knows both the identity of the requesting user and the identity of the requested EJB method M1. Authorization layer 74 accesses method-role mapping table 76 to acquire a list of role(s) authorized to access EJB method M1 (Arrow 3). Authorization layer 74 sends this list of authorized role(s) along with the identity of the requesting user to security service 72 (Arrow 4). Security service 72 then looks up the name of the requesting user in role table 78 to determine which role(s) that requester holds. Like method-role mapping table 76, role table 78 has been previously generated, preferably by the system manager. Security service 72 compares the requesting user's role(s) (found in role table 78) with the role(s) which will allow access to EJB method M1 (as determined by method-role mapping table 76), and determines if there is a role match. The results of this role matching are sent back to authorization layer 74 (Arrow 5). If the roles matched, authorization layer 74 notifies EJB object 64 that EJB method M1 to be run (Arrow 6), and the results of running EJB method M1 are returned to ORB 70 (Arrow 7). If the roles do not match, authorization layer 74 sends ORB 70 a fault message (Arrow 7a), such as an "Interrupt," "Time out," "Error," or similar message, notifying ORB 70 that the request for EJB method M1 is not authorized. The results from EJB method M1 or the fault message are then returned to client code 68 for the requesting user (Arrow 8).

Figure 7:
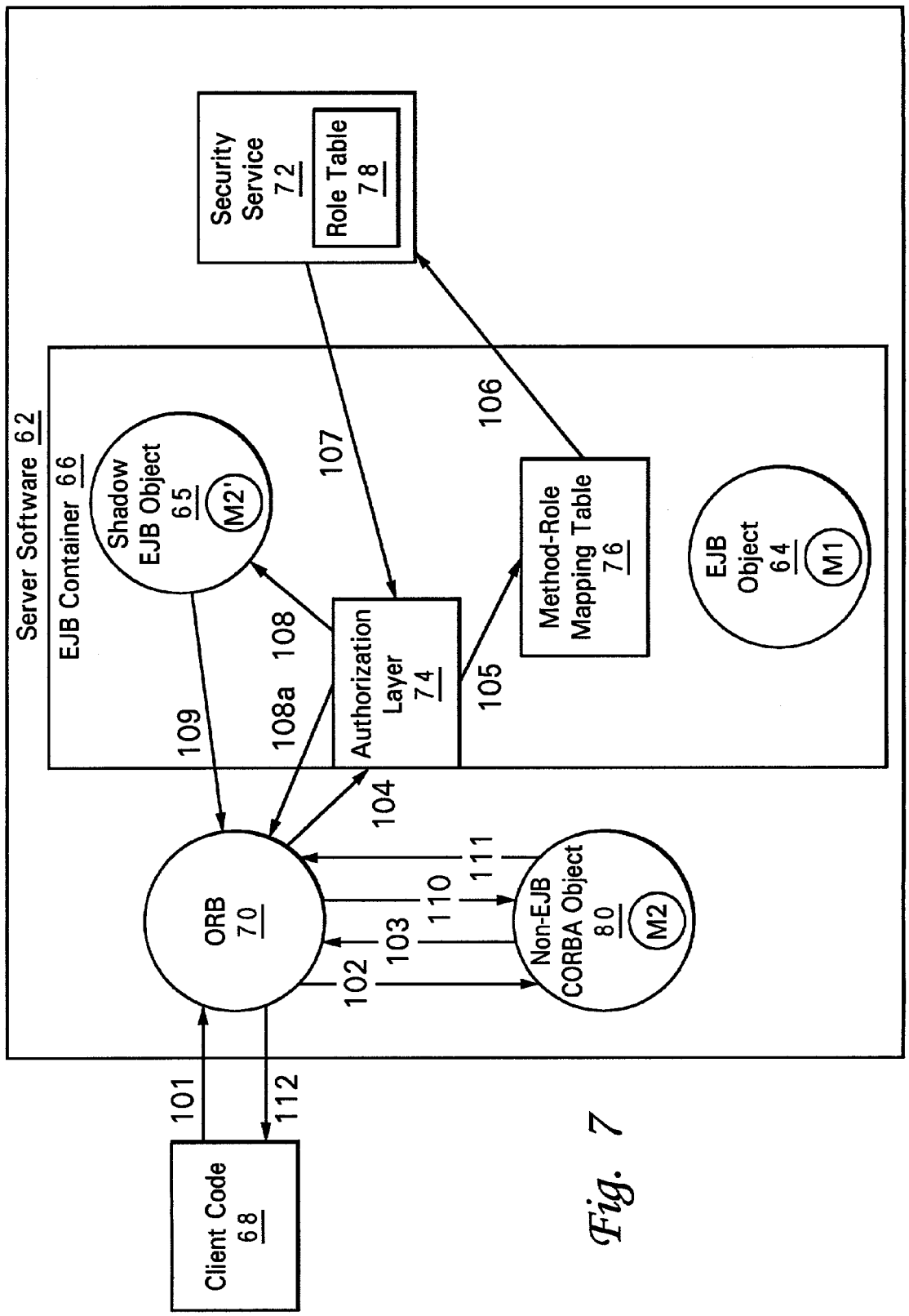
FIG. 7 is a software diagram depicting the use of EJB security measures to authorize access to a non-EJB CORBA method.

Reference is now made to FIG. 7, which depicts a non-EJB Common Object Request Broker Architecture (CORBA) object 80 located in server software 62 that is being requested. Note that while EJB objects described above are actually types of CORBA objects, for clarity EJB CORBA objects will be referred to as "EJB objects" and non-EJB CORBA objects will now be referred to as "CORBA objects." Note further that EJB object 64 may also reside in server software 62 within EJB container 66, but the request described in FIG. 7 is for a method on CORBA object 80, NOT for a method from EJB object 64. As described above, CORBA objects do not have inherent security authorization protocols. Therefore, the inventive process now described affords such authorization security to CORBA object 80 and its methods.

As with the request for an EJB object described in FIG. 6, a request is shown in FIG. 7 for a CORBA method M2 from client code 68 as being sent to ORB 70 (Arrow 101). ORB 70 directs the request to CORBA object 80, which contains a CORBA method M2 (Arrow 102), which conforms to the CORBA specification. CORBA object 80 has previously been modified by the system manager to redirect the request for CORBA method M2 to shadow EJB object 65.

Shadow EJB object 65 is an object created under the J2EE and EJB specifications to mirror CORBA object 80. Shadow EJB object 65 contains methods that correspond to CORBA methods found in CORBA objects, but shadow EJB object 65 contains no variables or data. Thus, shadow EJB object 65 is preferably incapable of performing any function other enabling than the authorization of access to CORBA object 80 as described in detail below. In the depiction, a shadow EJB method M2' is an EJB counterpart to CORBA method M2. For programmer convenience, shadow EJB method M2' may have the same name as CORBA method M2, or shadow EJB method M2' and CORBA method M2 may have different names. As illustrated by Arrow 103, CORBA object 80 then directs a request for shadow EJB method M2' to ORB 70. ORB 70 sends the request for shadow EJB method M2' to authorization layer 74 (Arrow 104).

Method-role mapping table 76 contains a listing of which roles are authorized to access shadow EJB method M2'. Part of the request protocol from client code 68 identifies the particular user making the request for CORBA method M2. Thus, authorization layer 74 knows both the identity of the requesting user and the identity of the requested CORBA method M2 and its shadow EJB method M2'. Authorization layer 74 accesses method-role mapping table 76 to acquire a list of role(s) authorized to access shadow EJB method M2' (Arrow 105). Authorization layer 74 sends this list of authorized role(s) along with the identity of the requesting user to security service 72 (Arrow 106). Security service 72 then looks up which role(s) the requesting user has in role table 78. Security service 72 compares the requesting user's role(s) (found in role table 78) with the role(s) which will allow access to shadow EJB method M2' (as determined by method-role mapping table 76), and determines if there is a role match.

The results of this role matching are sent back to authorization layer 74 (Arrow 107). If the roles matched, authorization layer 74 notifies shadow EJB object 65 that shadow EJB method M2' may be run (Arrow 108), and ORB 70 is notified that shadow EJB method M2', and thus non-EJB CORBA method M2, is authorized to run (Arrow 109). If the roles do not match, authorization layer 74 sends to ORB 70 a fault message, such as "Interrupt," "Time out," "Error," or a similar message, notifying ORB 70 that the request for non-EJB CORBA method M2 is not authorized (Arrow 108a). Either the result of the successful call to shadow EJB method M2' or the fault message will then be sent from ORB 70 back to non-EJB CORBA object 80. If a fault message is returned to non-EJB CORBA object 80, that fault message is propagated back to ORB 70 for transmittal back to client code 68 and the requesting user (Arrow 112). If the roles matched, then non-EJB CORBA object 80 is allowed to execute CORBA method M2 (Arrow 110), and non-EJB CORBA object 80 returns the requested results of executing CORBA method M2 to ORB 70 (Arrow 111) for transmittal back to client code 68 (again Arrow 112). Thus, object 80 has been able to use the EJB security methodology enabled by shadow EJB object 65.

Figure 8:
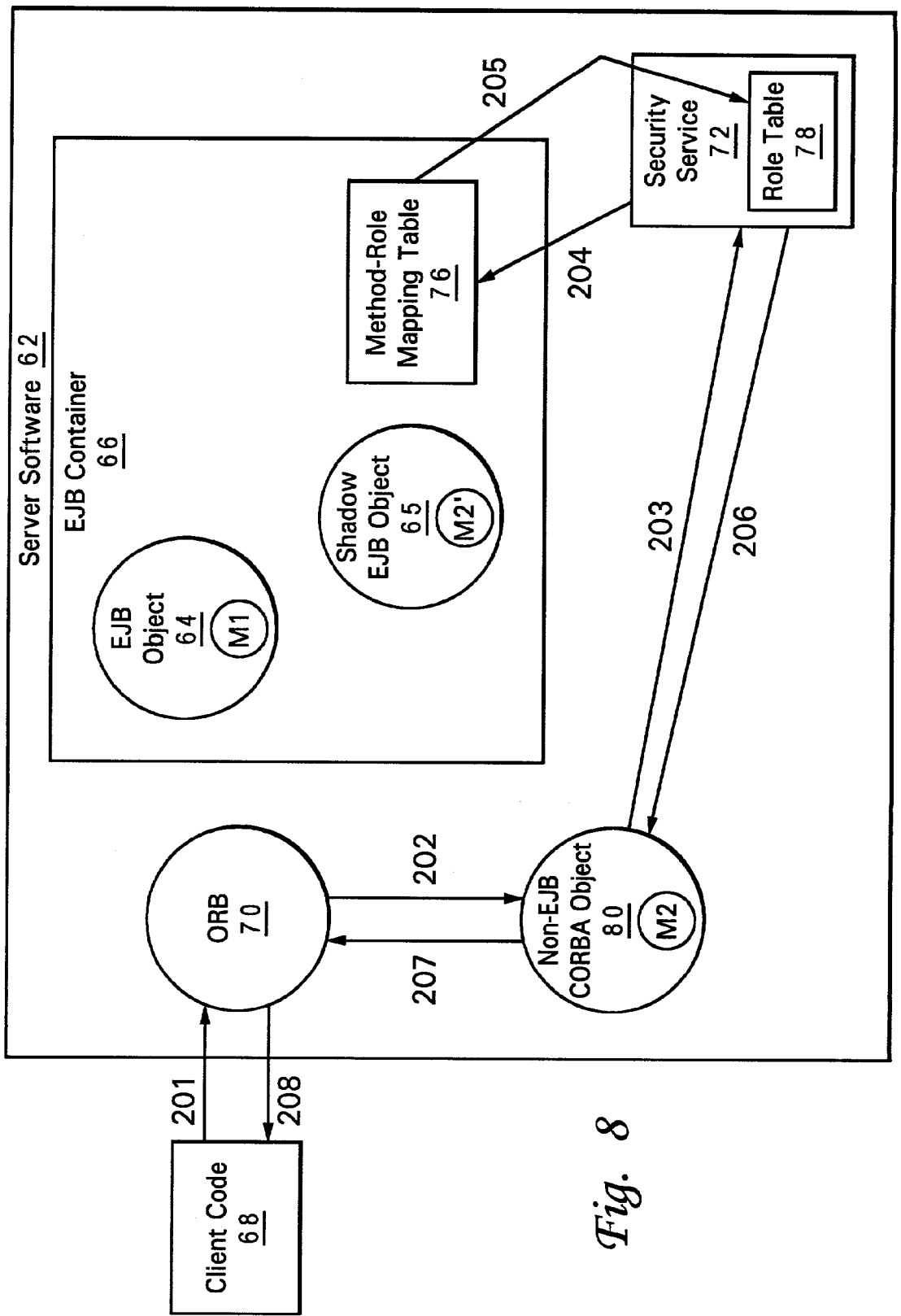
FIG. 8 is a software block diagram illustrating a shortcut method of using EJB security measures to authorize access to a non-EJB CORBA method.

Referring now to FIG. 8, there is depicted a block diagram of software used in an alternative embodiment of the present invention, wherein method-role mapping table 76 is directly accessed without calling a shadow EJB object. As in FIG. 7, server software 62 as depicted in FIG. 8 may contain EJB object 64 as well as CORBA object 80 and its shadow EJB object 65. However, FIG. 8 again assumes the request for a method from client code 68 is for a method on CORBA object 80. Thus, client code 68 sends a request to ORB 70 for a CORBA method M2 (Arrow 201). ORB 70 directs the request to CORBA object 80, which contains CORBA method M2 (Arrow 202). CORBA object 80 has been previously modified to utilize a "shortcut" EJB security mechanism derived from that described above. Thus, CORBA object 80 first sends security service 72 the name of shadow EJB 65 and the name of shadow EJB method M2' located on shadow EJB object 65 (Arrow 203).

Part of the request protocol from client code 68 identifies the particular user making the request for non-EJB CORBA method M2. Thus security service 72 has both the name of the user and enough information to access the method-role mapping table 76 for shadow EJB object 65. Security service 72 then requests which role(s) are authorized to access shadow EJB method M2' (Arrow 204), and returns these role(s) to itself (Arrow 205). Security service 72 then looks up which role(s) the requesting user has in role table 78. Security service 72 compares the requesting user's role(s) (found in role table 78) with the role(s) which will allow access to shadow EJB method M2' (found in method-role mapping table 76), and determines if there is a role match. The results of this role matching are sent back to CORBA object 80 (Arrow 206). If the roles matched, CORBA object 80 returns the results of the request to CORBA method M2 to ORB 70 (Arrow 207), which passes the results on to client code 68 (Arrow 208). If the roles do not match, CORBA object 80 sends ORB 70 a fault message, such as an "Interrupt,", "Timeout," "Error," or similar message, which passes the fault message back to client code 68 (again Arrows 207 and 208).

Figure 9:
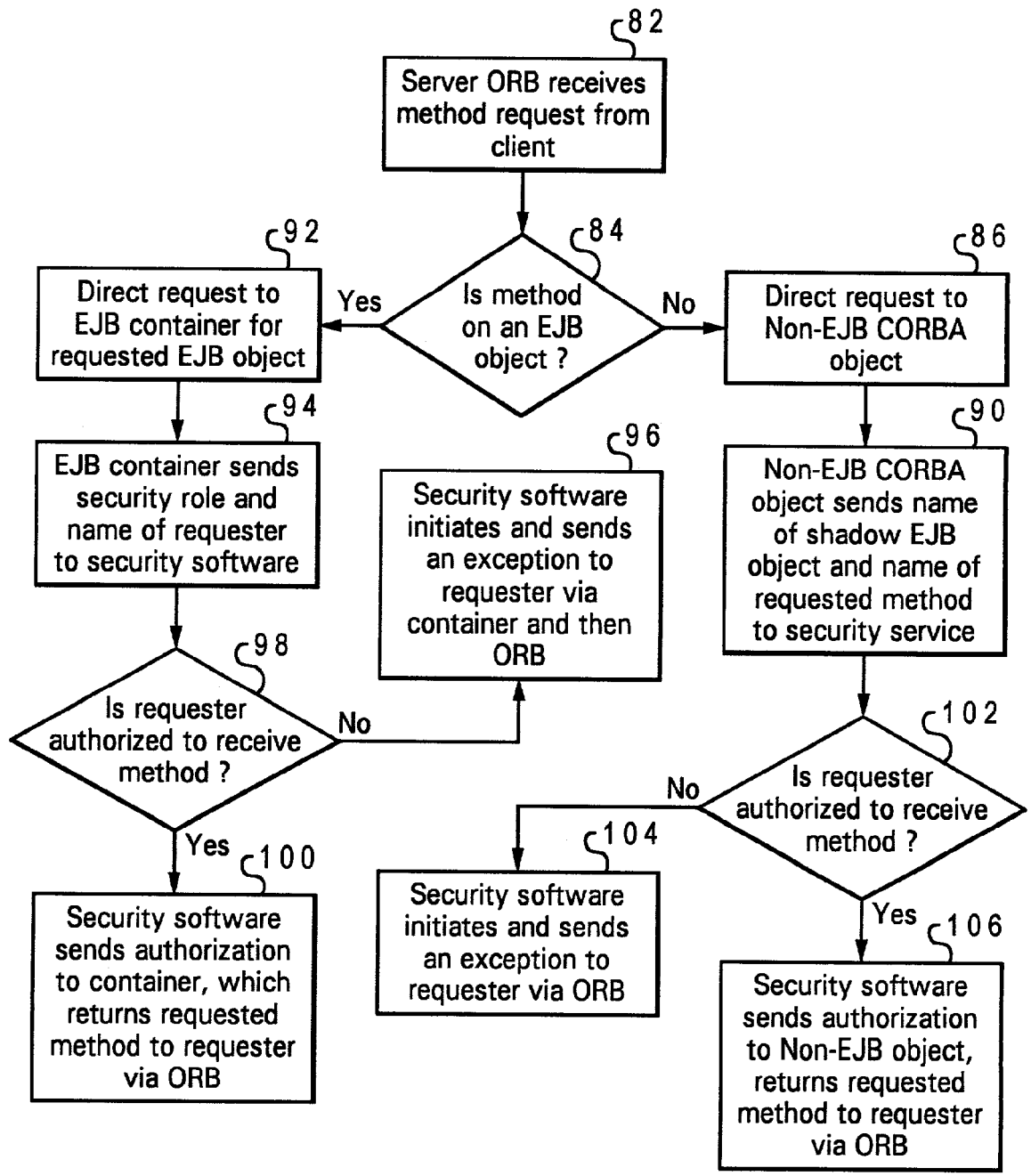
FIG. 9 is a high-level software flowchart showing the implementation of the method access authorization measures used by the present invention.

Reference is now made to FIG. 9, which is a high-level software flowchart of the embodiment of the present invention as depicted in FIG. 8. As depicted in block 82, the server ORB receives the method request from the specific user of the client computer. The server ORB queries, as described in block 84, whether the method is located in an EJB object or a non-EJB CORBA object. If the method is on a non-EJB CORBA object, the request is directed to that non-EJB CORBA object as shown in block 86. The non-EJB CORBA object then sends the name of the shadow EJB object and the name of the requested method to the security service, as depicted in block 90. The security service uses this information to locate the role-method table for the shadow EJB method and checks for authorization of the user to call the shadow EJB method, and thus the non-EJB CORBA method, according to the role matching process described above. If the requester is authorized to call the method, then the method on the CORBA object is allowed to return a result to the requester, as described in blocks 102 and 106. If the roles do not match, an exception message is returned to the requester, as shown in block 104.

If the method called is a method on an EJB object, the request for the method is directed to that EJB object, as described in block 92. The container having the EJB object sends the required security role and name of the requester to the security service, as described in block 94. The security service then role matches (block 98), and either returns a result from the requested method (block 100) or an error message (block 96) back to the requester.

The present invention therefore provides security authorization for non-EJB CORBA methods and objects without having to create a separate parallel security mechanism with the existing EJB security mechanism in the server. Using role based authorizations allows scalability by simply assigning as many users as desired the required role to access the method. By using the existing EJB security mechanism, speed is increased since a separate security authorization program, with its own memory and table requirements, is not needed. Thus, common security runtime, deployment tools, installation tools and administration tools already in place for EJB objects can be used for authorizing and invoking non-EJB CORBA objects and methods.

It should further be appreciated that the method described above for utilizing EJB security with non-EJB CORBA objects can be embodied in a computer program product in a variety of forms, and that the present invention applies equally regardless of the particular type of signal bearing media utilized to actually carry out the method described in the invention. Examples of signal bearing media include, without limitation, recordable type media such as floppy disks or compact disk read only memories (CD ROMS) and transmission type media such as analog or digital communication links.

While the invention has been particularly shown and described with reference to a preferred embodiment, it will be understood by those skilled in the art that various changes in form and detail may be made therein without departing from the spirit and scope of the invention. For example, while the invention has been described as being used in a server on a network, the method and system described may be practiced on a stand-alone computer such as a desktop, a laptop or a personal digital assistance (PDA).

What is claimed is:

1. A process for accessing a non-Enterprise JavaBean (EJB) Common Object Broker Request Architecture (CORBA) object method on a server, said process comprising:

receiving at the server a request from a requesting user for the non-EJB CORBA object method;

redirecting said request to a shadow EJB object method of a shadow EJB object, said shadow EJB object method being a complementary method to the non-EJB CORBA object method, wherein the shadow EJB object is incapable of performing any function other than enabling authorization for the requesting user to access a non-EJB CORBA object that contains the non-EJB CORBA object method;

accessing an EJB security system in response to the request for the shadow EJB object method;

verifying by the EJB security system if the requesting user is authorized to access the shadow EJB object method; and allowing the requesting user to access the non-EJB CORBA object method if the requesting user is authorized to access the shadow EJB object method.

2. The process of claim 1, wherein the server has access to said non-EJB CORBA object method and a non-shadow EJB object method.

3. The process of claim 1, further comprising:

receiving an assigned user role for a requesting user of a client computer connected to the server;

storing said user role in the server;

generating a method-role mapping table to define an authorized role to access said shadow EJB object method; and comparing said assigned user role with said authorized role to determine if said requesting user is authorized to access said shadow EJB object method.

4. The method of claim 1, wherein the authorization is based on a role of the specific requesting user, wherein the role is based on the specific requesting user's job description in an enterprise.

5. A computer system server for providing a non-Enterprise JavaBean (EJB) Common Object Broker Request Architecture (CORBA) object method, said computer system server comprising:

means for receiving at the computer system server a request from a requesting user for the non-EJB CORBA object method;

means for redirecting said request to a shadow EJB object method of a shadow EJB object, said shadow EJB object method being a complementary method to the non-EJB CORBA object method, wherein the shadow EJB object is incapable of performing any function other than enabling authorization for the requesting user to access a non-EJB CORBA object that contains the non-EJB CORBA object method;

means for accessing an EJB security system in response to the request for the shadow EJB object method;

means for verifying by the EJB security system if the requesting user is authorized to access the shadow EJB object method; and means for allowing the requesting user to access the non-EJB CORBA object method if the requesting user is authorized to access the shadow EJB object method.

6. The computer system server of claim 5, wherein the computer system server has access to said non-EJB CORBA object method and a non-shadow EJB object method.

7. The computer system server of claim 5, further comprising:

means for receiving a user role for a requesting user of a client computer connected to the computer system server;

means for storing said user role in the computer system server;

means for generating a method-role mapping table to define an authorized role to access said shadow EJB object method; and means for comparing said user role with said authorized role to determine if said requesting user is authorized to access said shadow EJB object method.

8. The computer system server of claim 5, wherein the authorization is based on a role of the specific requesting user, wherein the role is based on the specific requesting user's job description in an enterprise.

9. A computer program product, residing on a computer recordable medium, for accessing a non-Enterprise Java-Bean (EJB) common Object Broker Request Architecture (CORBA) object method on a server, said computer program product comprising:

program code means for receiving at a server a request from a requesting user for a non-EJB CORBA object method;

program code means for redirecting said request to a shadow EJB object method of a shadow EJB object, said shadow EJB object being a complementary method to the non-EJB CORBA object method, wherein the shadow EJB object method is incapable of performing any function other than enabling an authorization for the requesting user to access a non-EJB CORBA object that contains the non-EJB CORBA object method;

program code means for accessing an EJB security system in response to the request for the shadow EJB object method;

program code means for verifying by the EJB security system if the requesting user is authorized to access the shadow EJB object method; and program code means for allowing the requesting user to access the non-EJB CORBA object method if the requesting user is authorized to access the shadow EJB object method.

10. The computer program product of claim 9, wherein said server has access to said non-EJB CORBA object method and a non-shadow EJB object method.

11. The computer program product of claim 9, further comprising:

program code means for receiving an assigned user role for a requesting user of a client computer connected to the server;

program code means for storing said user role in the server;

program code means for generating a method-role mapping table to define an authorized role to access said shadow EJB object method; and program code means for comparing said assigned user role with said authorized role to determine if said requesting user is authorized to access said shadow EJB object method.

12. The computer program product of claim 9, wherein the authorization is based on a role of the specific requesting user, wherein the role is based on the specific requesting user's job description in an enterprise.

* * * * *